(12) United States Patent
Bertolini et al.

(10) Patent No.: US 11,808,298 B2
(45) Date of Patent: Nov. 7, 2023

(54) BEARING UNIT WITH OPTIMIZED ANCHORING OF THE SEALING DEVICE

(71) Applicant: AKTIEBOLAGET SKF, Gothenburg (SE)

(72) Inventors: Andrea A. Bertolini, Carrara (IT); Fausto Baracca, Massa (IT); Fabio Cavacece, Rome (IT); Pasquale Frezza, Aversa (IT)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 17/845,300

(22) Filed: Jun. 21, 2022

(65) Prior Publication Data

US 2023/0003258 A1     Jan. 5, 2023

(30) Foreign Application Priority Data

Jun. 30, 2021   (IT) ......................... 102021000017093

(51) Int. Cl.
*F16C 33/78* (2006.01)

(52) U.S. Cl.
CPC .......... *F16C 33/785* (2013.01); *F16C 33/783* (2013.01); *F16C 33/7846* (2013.01); *F16C 2226/74* (2013.01)

(58) Field of Classification Search
CPC ................ F16C 33/783; F16C 33/7843; F16C 33/7846; F16C 33/785; F16C 33/80; F16C 2226/74
See application file for complete search history.

(56) References Cited

U.S. PATENT DOCUMENTS

| 3,206,262 | A  | * | 9/1965 | Haag ................... F16C 33/7853 |
| | | | | 277/577 |
| 11,578,758 | B2 | * | 2/2023 | Baracca ............. F16C 33/7843 |
| 2003/0154602 | A1 | * | 8/2003 | Obara .................. F16C 19/163 |
| | | | | 29/898.068 |
| 2006/0088238 | A1 | * | 4/2006 | Englander ............ F04D 29/059 |
| | | | | 384/625 |

FOREIGN PATENT DOCUMENTS

| EP | 0019361 | | 11/1980 |
| JP | 2017219129 A | * | 12/2017 |
| WO | WO-2017051880 A1 | * | 3/2017 |
| WO | 2017213042 | | 12/2017 |
| WO | WO-2017213042 A1 | * | 12/2017 |

OTHER PUBLICATIONS

Search Report for corresponding Italy Patent Application No. 2021000017093 dated Mar. 10, 2022.

* cited by examiner

*Primary Examiner* — Alan B Waits
(74) *Attorney, Agent, or Firm* — Reed Smith LLP

(57) ABSTRACT

A bearing unit having a radially outer ring, a radially inner ring, a row of rolling elements interposed between the outer ring and the inner ring, a shaped sealing screen interposed between the inner ring and the outer ring and stably inserted inside a first seat of the outer ring, and a snap ring stably inserted inside a second seat of the radially outer ring and interacting with the shaped screen so as to lock it in the first seat.

11 Claims, 5 Drawing Sheets

Detail A

Fig. 2 – Detail A

Fig. 3 – Detail B

BEARING UNIT WITH OPTIMIZED ANCHORING OF THE SEALING DEVICE

CROSS-REFERENCE TO RELATED APPLICATIONS

This application is based on and claims priority to Italian Patent Application No. 102021000017093 filed on Jun. 30, 2021, under 35 U.S.C. § 119, the disclosure of which is incorporated by reference herein.

FIELD

The present disclosure relates to a bearing unit provided with an optimized system for anchoring a sealing device.

BACKGROUND

In bearing units, a sealing device may be used to prevent external contaminants from entering the bearing unit and to prevent grease or other lubricant from exiting the inside of the bearing unit.

BRIEF DESCRIPTION OF THE DRAWINGS

This disclosure will now be described with reference to the attached drawings which illustrate non-limiting exemplary embodiments of a bearing unit, in which.

DETAILED DESCRIPTION

Figure 1:
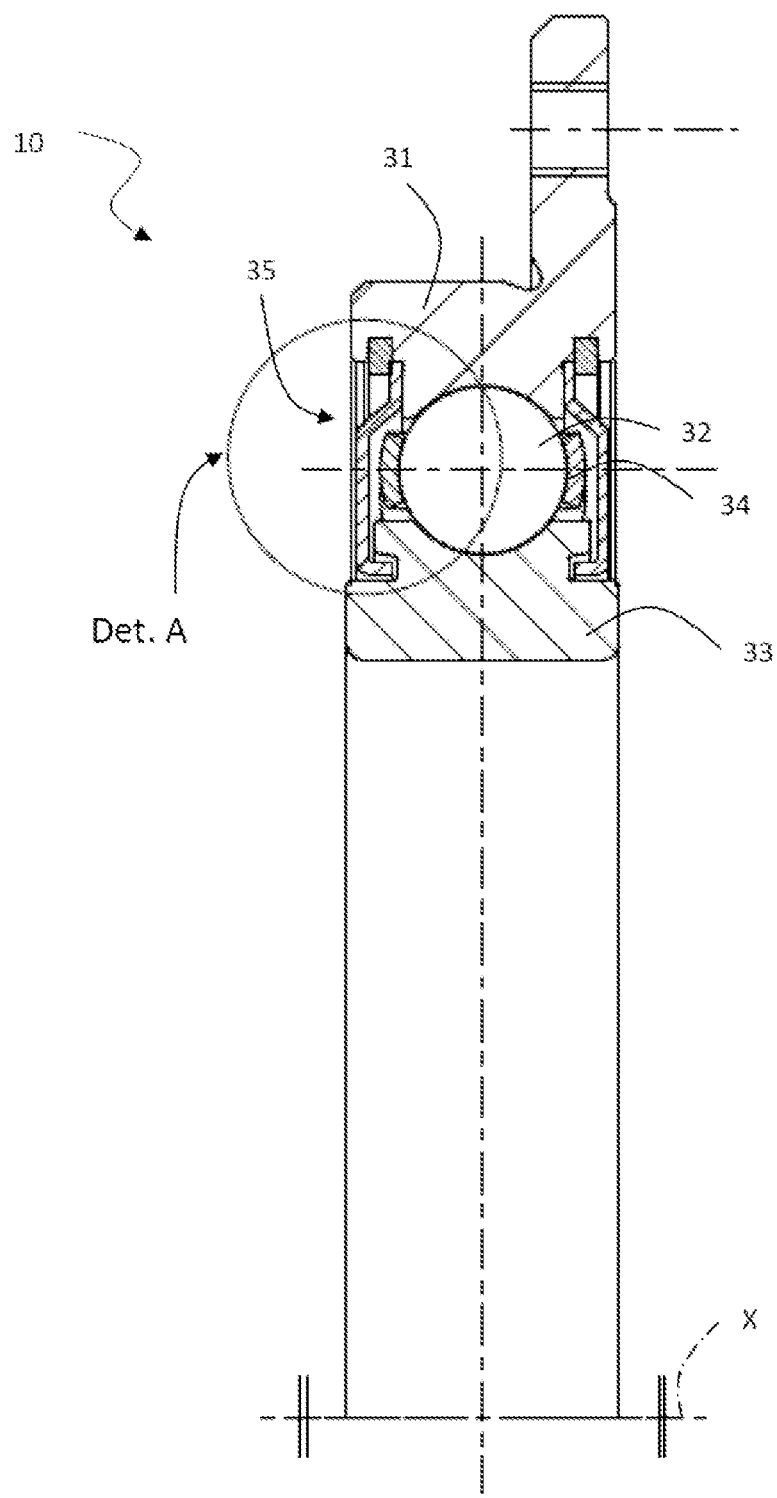
FIG. 1 shows a cross-sectional view of a bearing unit provided with a sealing device with a sealing means and a snap ring.

Bearing units provided with rolling elements are known, said rolling elements being used to allow relative movement of a component or group with respect to another component or group. The bearing unit has in general a first component, for example a radially outer ring, which is fixed to a rotating element, and a second component, for example a radially inner ring, which is fixed to a stationary element. It frequently happens that the radially inner ring is rotatable, while the radially outer ring is stationary, but in other applications, e.g. in the food industry, in the marble industry, the outer ring rotates (in the marble industry a typical rotational speed is around 750 rpm) and the inner ring is stationary. In any case, rotation of one ring with respect to the other ring is allowed by a plurality of rolling elements, which are positioned between the cylindrical surface of one component and the cylindrical surface of the second component, normally called raceways. The rolling elements may be balls, cylindrical or tapered rollers, needle rollers, or similar rolling elements.

It is likewise known that bearing units have suitable sealing devices for protection against external contaminants and for ensuring sealing of grease or other lubricants inside the bearing unit. Typically these sealing devices consist of a shaped screen mounted by means of interference in suitable seats of the rings of the bearing unit, for example the radially outer ring, and are made of metallic or plastic material, for example PTFE. These sealing devices must ensure an optimum performance both from a functional point of view and in terms of reliability, during a whole working life of the bearing unit. The sealing devices must not deteriorate over time and must always remain within their seats, otherwise they risk losing complete functionality.

In fact, one of the main problems of known sealing devices is the sealing device becoming accidentally detached, namely coming out of the seat during operation of the bearing unit. In order to avoid this problem, sealing devices are provided with an element for anchoring the sealing means by locking it mechanically. Typically, the anchoring element is a snap ring, which is made of metallic material and locked inside a seat of the radially outer ring of the bearing unit.

Problems still exist with known anchoring elements. The anchoring of a shaped screen poses a problem associated with axial play. Known snap rings require an axial play equal to at least 15% of its total width in order to be assembled. The consequence of this axial play is that the snap ring does not push the shaped screen against the radially outer ring. Therefore, there is risk that the shaped screen may rotate inside the seat of the radially outer ring and damage not only the outer ring, but also the radially inner ring.

Moreover, a lack of a contact with the radially outer ring means that there is a possibility of a significant leakage of grease on an anchoring side of the shaped screen. This may happen because, in applications where the radially outer ring rotates, resultant centrifugal forces cause the grease to reach a top part of the anchoring system. Therefore, there is a possibility that the grease may escape the sealing system of the bearing unit.

In specific applications where large dimensions are involved, grease leakage is very real because large and thin snap rings utilized have a very marked undulation. Thus, during assembly, a groove of a seat formed on the radially outer ring tends to flatten out the snap ring as far as possible, such that in some places, the snap ring will not make contact with the shaped screen, creating a small labyrinth along which the grease is able to pass.

There therefore exists a need to define a bearing unit provided with a sealing system which does not have the aforementioned drawbacks.

An object of the present disclosure is to provide a bearing unit with an optimized sealing device that seals the bearing unit from external contaminants while preventing leakage of grease from inside of the bearing unit.

An object of the present disclosure is achieved by means of a particular geometry of an anchoring groove of a sealing device present in a radially outer ring. In particular, the geometry of the groove has an inclined face, which allows a snap ring to fill all empty spaces and to enter perfectly into contact with a shaped screen. This allows the shaped screen to avoid any type of rotation inside the seat of the outer ring and to avoid assuming an inclined position and come into contact with the surfaces of the inner ring of the bearing unit, with consequent damage thereto.

With reference now to the figures, exemplary embodiments of a bearing unit according to the present disclosure are described purely by way of non-limiting example.

With particular reference to FIG. 1, a bearing unit 10 may include a rotatable radially outer ring 31 with a central axis of rotation X of bearing unit 10, a stationary radially inner ring 33, a row of rolling elements 32, e.g. balls, rollers, interposed between radially outer ring 31 and radially inner ring 33, and a cage 34 for containing row of rolling elements 32 so as to keep the rolling elements in position.

In the whole of the present disclosure and in the claims, terms and expressions indicating positions and orientations such as "radial" and "axial" are understood as referring to central axis of rotation X of bearing unit 10.

For simplicity of graphical illustration, reference number 32 will be attributed both to individual rolling elements and to a row of elements. Again for simplicity, the term "ball" may be used by way of example in the present disclosure and in the attached drawings instead of the more generic term "rolling element" (and likewise the same reference numbers will be used). Some examples of embodiments and the associated drawings may envisage the use of rolling elements other than balls (for example rollers) without thereby departing from the scope of the present disclosure.

Bearing unit 10 may also be provided with one or more sealing devices 35 for sealing off bearing unit 10 from an external environment. Below the sealing devices 35 may be indicated also more simply as seals 50, obviously understood as referring to the same component.

Figure 2:
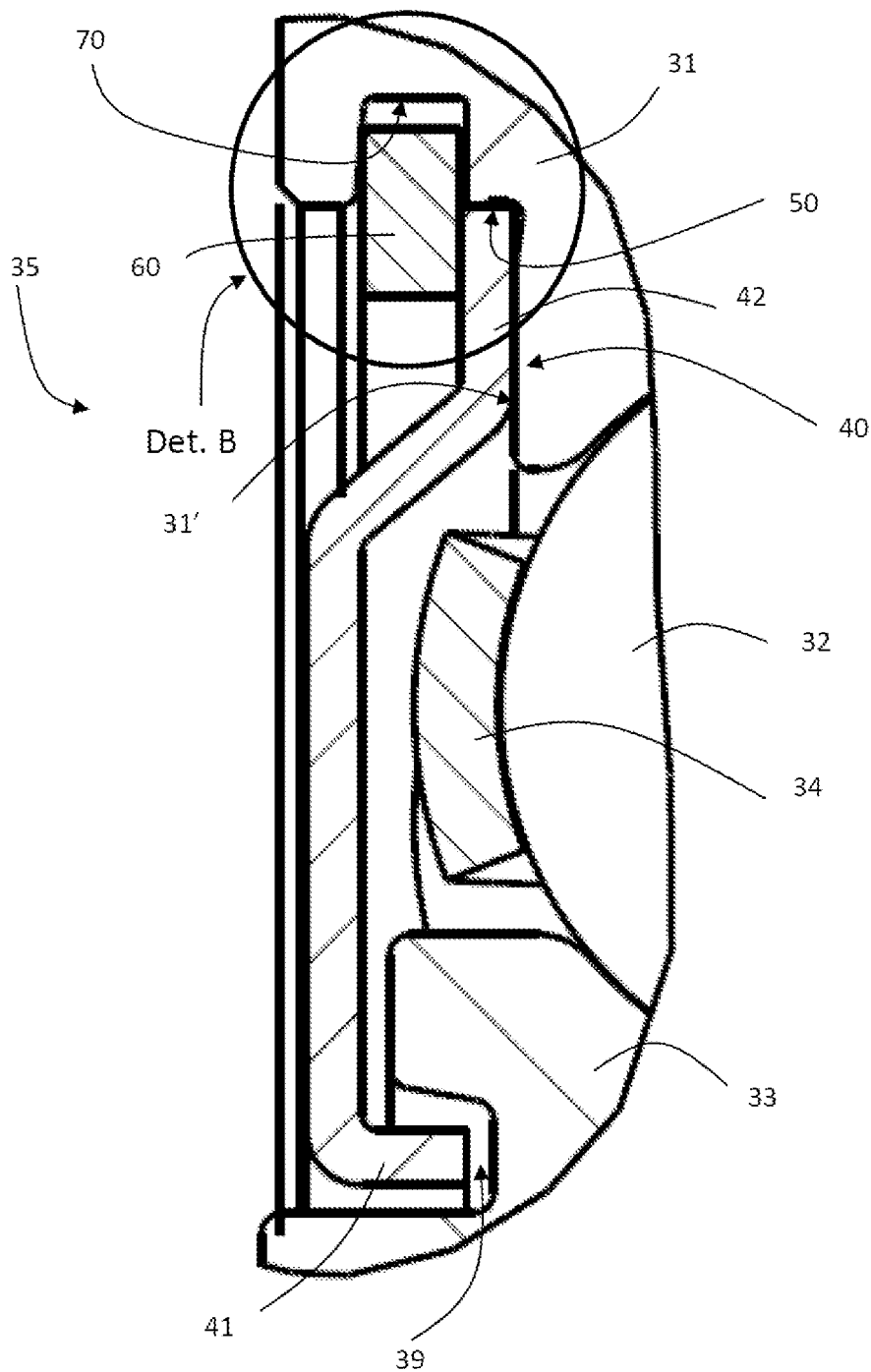
FIG. 2 shows a detail view of the sealing device shown in FIG. 1.
Figure 3:
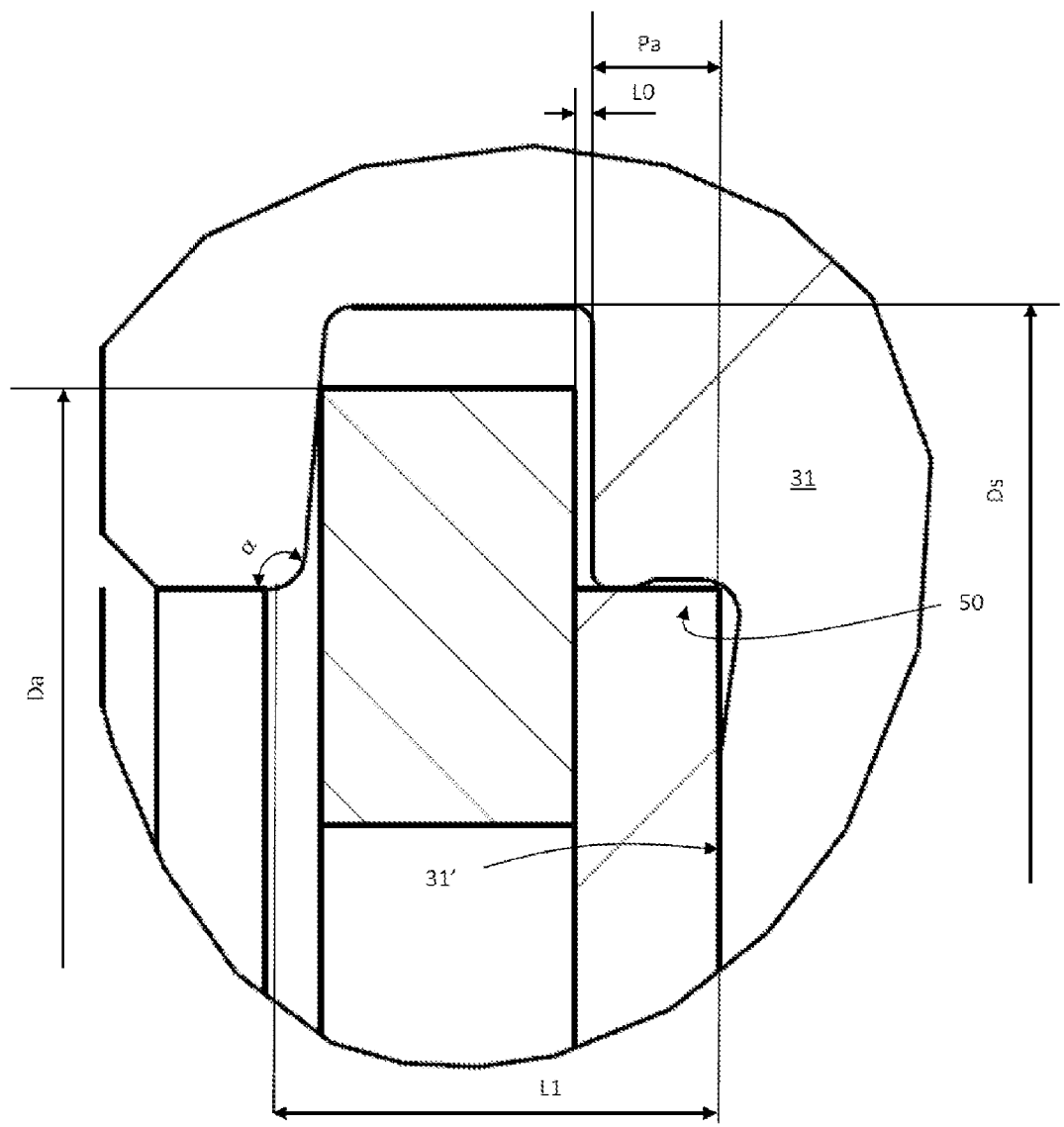
FIG. 3 shows a detail view of the sealing device shown in FIG. 2.
Figure 4:
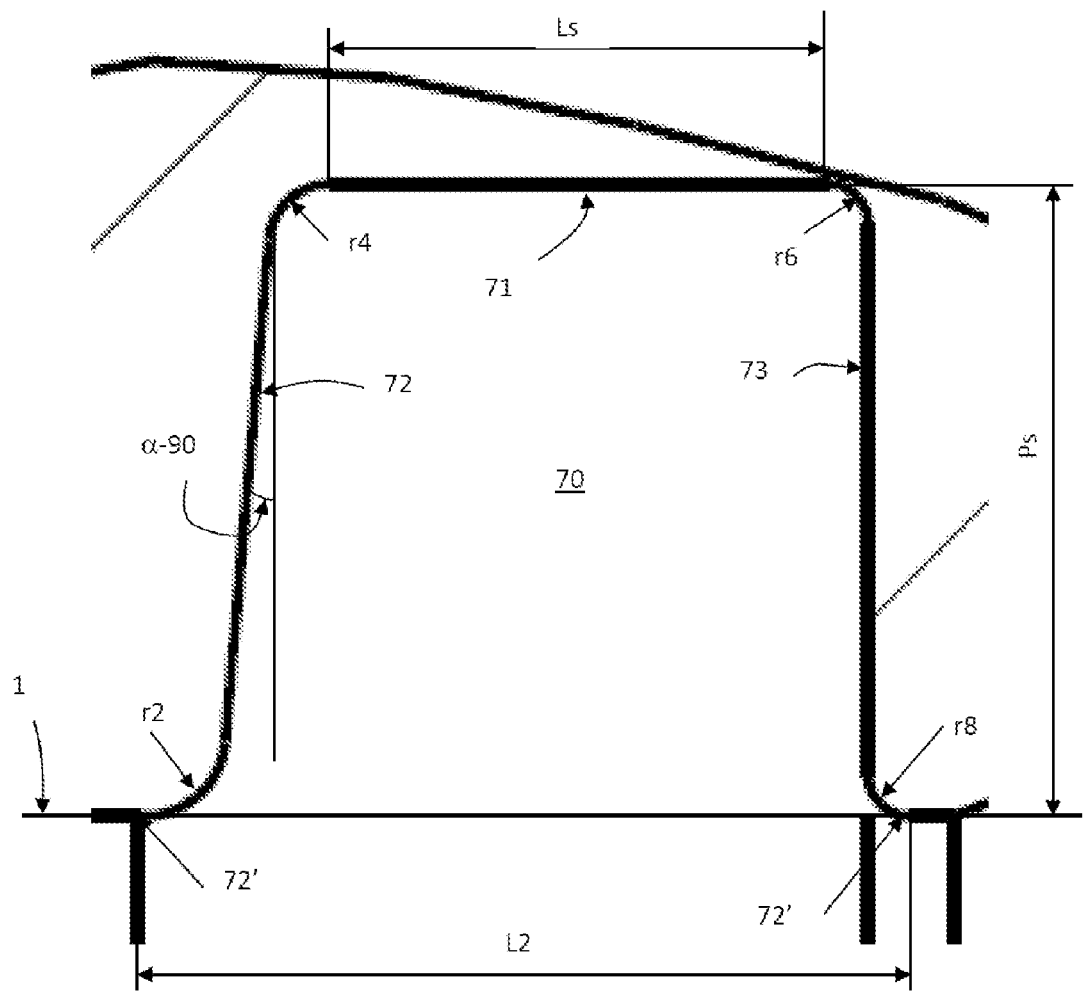
FIG. 4 shows a schematic detail view of a seat of a snap ring of the sealing device.
Figure 5:
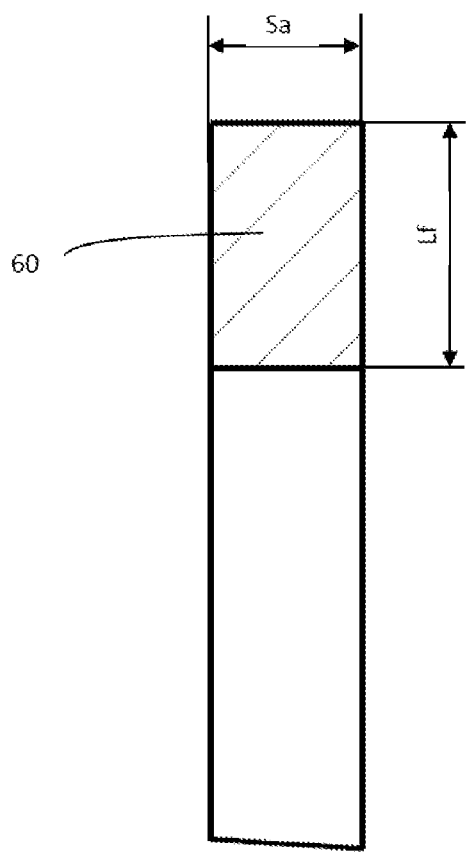
FIG. 5 shows a detail view of the snap ring.
Figure 6:
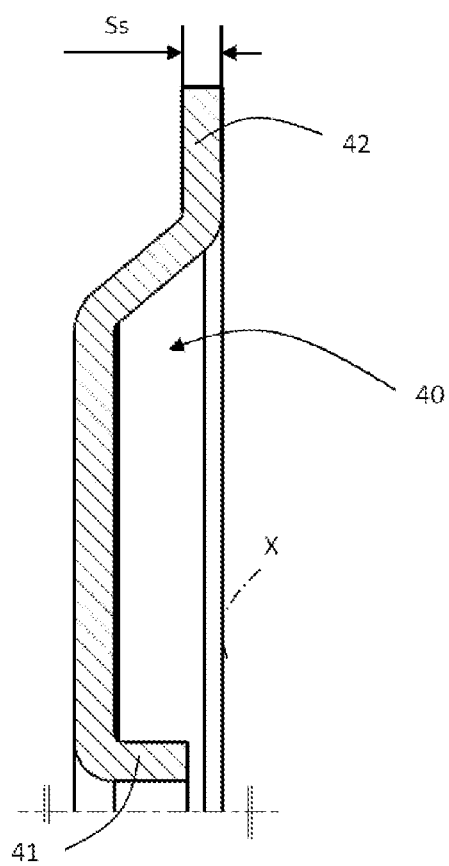
FIG. 6 is a detail view of the sealing means of the bearing unit shown in FIG. 1.

In various embodiments, a bearing unit 10 may be provided with a sealing device 35 having an optimized anchoring system. With reference to FIG. 2, a sealing device 35 may be interposed between radially inner ring 33 and radially outer ring 31. Sealing device 35 may have a shaped sealing screen 40 made of a metallic material and include a cylindrical portion 41. Shaped sealing screen 40 may have a particular shape configured to allow shaped sealing screen 40 to form a labyrinth seal 39 between cylindrical portion 41 and radially inner ring 33 that is particularly advantageous for preventing entry of contaminants inside bearing unit 10.

In various embodiments, shaped sealing screen 40 may be stably inserted by means of a radially distal flanged portion 42 inside a first seat 50 of radially outer ring 31. Shaped sealing screen 40 may be kept in a stable position inside first seat 50 due to a locking action of an anchoring element 60, e.g., a snap ring 60 made of a metallic material. Snap ring 60 may be inserted by means of interference inside a second seat 70 of radially outer ring 31.

With reference to FIGS. 3-6, an optimized anchoring system for anchoring a sealing device 35 to a bearing unit 10 according to the present disclosure is described below.

In various embodiments, an axial thickness Ss of shaped sealing screen 40 may be greater than an axial depth Pa of seat 50 by an axial length L0. In other words, shaped sealing screen 40 axially occupies at least part of an inlet 72' of second seat 70.

A second seat 70 may be a groove 70 formed in radially outer ring 31. Groove 70 may extend radially outwards from axis X and inside outer ring 31 from an inner-lying free cylindrical surface 1 of outer ring 31. Groove 70 may be defined radially by a cylindrical bottom surface 71 and axially by an annular surface 72, which is inclined with respect to axis X, and by a straight annular surface 73 transverse to axis X.

Inclined annular surface 72 may be connected to cylindrical surface 1 and to cylindrical bottom surface 71 by means of a first fillet radius r2 and a second fillet radius r4, respectively. Straight annular surface 73 may be connected to cylindrical bottom surface 71 and to cylindrical surface 1 by means of a third fillet radius r6 and a fourth fillet radius r8, respectively. Annular surface 72 may be inclined with respect to axis X by an angle α ranging between a minimum value of 94° and a maximum value of 100° and with a nominal value of 95°.

Inclined annular surface 72 helps ensure that snap ring 60, once mounted inside groove 70, locks shaped sealing screen 40 inside first seat 50 against a surface 31' of radially outer ring 31.

In various embodiments, a snap ring 60 that is a Seeger type ring that has a slit that allows snap ring 60 to deform by means of compression when inserted inside groove 70. Groove 70 may therefore have a total diameter Ds that is smaller than a diameter Da of snap ring 60 in a rest condition, i.e. when snap ring 60 is not compressed. In various embodiments, diameter Da of snap ring 60 may be greater than a maximum of diameter Ds of groove 70 by an amount ranging between 3% and 5%.

In various embodiments, snap ring 60 may have an axial play of at least 15% of a total axial width of snap ring 60 in an assembly process. In other words, snap ring 60 may Once inserted inside groove 70, snap ring 60 expands due to its elasticity. When snap ring 60 comes into contact with inclined annular surface 72, snap ring 60 may be pushed towards straight annular surface 73, thus eliminating axial play with shaped screen 40 that is present at a start of an assembly process of snap ring 60. Snap ring 60 may begin to exert a thrusting action that pushes shaped sealing screen 40 against surface 31' of radially outer ring 31.

In other words, inclined annular surface 72 forces snap ring 60 against shaped screen 40 and pushes both against radially outer ring 31. This effect is due to elasticity of snap ring 60. As mentioned, outer diameter Da snap ring 60 is greater than diameter Ds of groove 70. This means that when snap ring 60 is forced inside groove 70, it tries to come into contact with cylindrical bottom surface 71 of groove 70. However, this is not possible because, owing to a conical shape of groove 70, the greater the diameter of snap ring 60, which is trying to expand, the greater will be a pressure of snap ring 60 against shaped sealing screen 40 and radially outer ring 31, resulting in a robust and stable positioning.

Furthermore, since snap ring 60 is elastic, centrifugal forces arising from rotation of inner ring 33 help to ensure that snap ring 60 is pushed inside groove 70, increasing the effects described above. In various embodiments, a rotational speed of outer ring 31 may be of the order of 750 rpm.

By stably locking shaped sealing screen 40, a sealing device 35 prevents possible inclination of shaped sealing screen 40 inside first seat 50 and consequent damage to inner ring 33 and outer ring 31 of bearing unit 10 and grease leakages on an anchoring side of shaped sealing screen 40.

Optimized dimensions of a groove 70 are of fundamental importance for fully achieving optimum sealing performance and preventing damage to inner ring 33 and outer ring 31 of bearing unit 10.

In various embodiments, a thickness Sa of a snap ring 60 may be configured to maximize these effects together with angle α of inclined annular surface 72 of groove 70. As mentioned previously, angle α may range from 94° to 100° with respect to axis X.

If angle α is below 94°, inclined annular surface 72 becomes practically transverse to axis X and therefore may not compensate for axial play between the axial width of snap ring 60 and the axial width of groove 70. In fact, the greater a radial development of annular surface 72, the less an axial thrust pushing snap ring 60 against shaped sealing screen 40 and radially outer ring 31 may be.

If α is greater than 100°, inclined annular surface 72 may act as a ramp due to the increased incline, causing an external force to push snap ring 60 out of groove 70.

An angle α in a range of 94°-100° with respect to a central axis X of a bearing unit 10 ensures a stable axial seal due to the axial force created by an inclined annular surface 72. In various embodiments, a range of angle α may be assessed together with other dimensions, e.g., a width of snap ring 60, a width of groove 70, to ensure that snap ring 60 enters radially as far as possible inside groove 70 to prevent any risk of ejection.

In various embodiments, groove 70 may have a radial depth Ps measured from cylindrical surface 1. In various embodiments, radial depth Ps may be measured from an inlet 72' arranged along cylindrical surface 1. Inlet 72' may be defined by an engaging point of radius r2 and an engaging point of radius r8, both points engaging with cylindrical surface 1.

Radial depth Ps of groove 70 may not be less than 70% of a length Lf of an edge of snap ring 60. In this way, about 50-60% of length Lf will be situated inside groove 70, ensuring that snap ring 60 does not come out of groove 70 during operating conditions. The remaining 30-40% of length Lf may provide a sealing action against shaped sealing screen 40.

An axial length Ls of cylindrical bottom surface 71 has been calculated using a statistical approach to maximize an effect of the pressure of snap ring 60 on shaped sealing screen 40. Axial length Ls may be considered the minimum axial width of groove 70.

Consider, by way of non-limiting example, at least one embodiment in which a thickness Ss of shaped sealing screen 40 is between 0.75 mm and 0.8 mm with a nominal value of 0.8 mm, a thickness Sa of snap ring 60 is between 1.45 mm and 1.5 mm with a nominal value of 1.5 mm, and an axial distance L1 from an inlet 72' to a surface 31' of outer ring 31 is between 2.4 mm and 2.45 mm with a nominal value of 2.4 mm.

In these embodiments, entry of snap ring 60 inside groove 70 is ensured. A play g may be 0.1 mm even in unfavorable and extreme tolerance conditions. Play g is obtained from the formula:

$$g = L1 - Sa - Ss = 2.4 - 0.8 - 1.5 = 0.1 \text{ mm}.$$

An interference of the snap ring 60 inside groove 70 at cylindrical bottom surface 72 may be guaranteed. In fact, a minimum width Ls of groove 70 may be determined by a width L2 of groove 70 along inlet edges 72'. Fillet radii r2, r4, r6, and r8 are subtracted from width L2 according to:

$$Ls = L2 - (Ps - r2 - r4) \times \tan(\alpha - 90) - r2 - r4 - r6 - r8.$$

An axial projection of each fillet radii may be considered, but in various embodiments, these projections more or less coincide with corresponding values of the fillet radii.

An interference between thickness Sa of snap ring 60 and minimum width Ls of groove 70 at cylindrical bottom surface 71 may be at least equal to 0.04 mm in unfavorable and extreme conditions. This ensures that snap ring 60 is unable to reach cylindrical bottom surface 71 of groove 70 but remains inside groove 70 in an intermediate position where snap ring 60 may push against shaped sealing screen 40.

Advantageously, a length of snap ring 60 may be calculated so that, once assembled, a slit of snap ring 60 has a size equal to between 2% and 4% of a total length of groove 70 calculated along cylindrical bottom surface 71. In various embodiments, a slit is equal to 3.2% of the total length of groove 70. This ensures the stability of snap ring 60 inside groove 70 because in order to be removed from groove 70, a diameter of the snap ring must be reduced. This would require the size of the slit to be zero and therefore snap ring 60 remains locked in groove 70 unless extracted with a special tool.

Another particular feature of this disclosure is that angle α of inclined annular surface 72 is small enough to ensure that snap ring 60 remains inside groove 70 even if an external force is applied to it, but at the same time is big enough to ensure contact with shaped sealing screen 40 even in extreme conditions.

In various embodiments in which snap ring 60 has a small thickness and a large diameter, a pressing effect of snap ring 60 on shaped sealing screen 40 is further increased due to a very marked undulation. Once snap ring 60 has been inserted inside groove 70, the undulation makes snap ring 60 much more rigid by subjecting snap ring 60 to reaction forces acting against both inclined annular surface 72 and straight annular surface 73 and against shaped sealing screen 40. Consequently, there will be a greater pressure against shaped sealing screen 40, further ensuring that shaped sealing screen 40 remains in position.

By including an inclined annular surface 72 in groove 70, shaped sealing screen 40 may be kept in contact against surface 31' of radially outer ring 31. Furthermore, snap ring 60 may be kept in contact with shaped sealing screen 40, preventing shaped sealing screen 40 from rotating independently of radially outer ring 31 and subjecting outer ring 31 to wear. As a result, there is no gap between shaped sealing screen 40 and radially outer ring 31 and therefore no grease leakage. Additionally, there is no gap between snap ring 60 and shaped sealing screen 40 and consequently no grease leakage.

In addition to the embodiments of the disclosure, as described above, it is to be understood that numerous further variants exist. It must also be understood that said embodiments are only examples and do not limit either the scope of the disclosure, nor its applications, nor its possible configurations. On the contrary, although the description provided above enables the person skilled in the art to implement the present disclosure at least in one of its exemplary configurations, it must be understood that numerous variations of the components described are feasible, without thereby departing from the scope of the disclosure, as defined in the accompanying claims, interpreted literally and/or in accordance with their legal equivalents.

We claim:
1. A bearing unit, comprising:
   a radially outer ring rotatable with respect to an axis of rotation (X);
   a stationary radially inner ring;
   a row of rolling elements interposed between the radially outer ring and the radially inner ring;
   a shaped sealing screen interposed between the radially inner ring and the radially outer ring and inserted in a first seat of the radially outer ring; and
   a snap ring inserted in a second seat of the radially outer ring and configured to interact with the shaped sealing screen to lock the shaped sealing screen in the first seat,
   wherein,
      the second seat is axially defined at least in part by a first annular surface configured to cooperate with the snap ring and cause the snap ring to push axially against the shaped sealing screen,
      the shaped sealing screen comprises an axial thickness (Ss) greater than the axial depth (Pa) of the first seat by an axial length (L0), the shaped screen axially occupies part of a radially inner inlet of the second seat, and the second seat comprises a radial depth (Ps) of at least 70% of a radial length (Lf) of an edge of the snap ring.

2. The bearing unit of claim 1, wherein the second seat is radially defined by a cylindrical bottom surface and further axially defined by a second annular surface, wherein the first annular surface is inclined with respect to the axis of rotation (X) by an angle ($\alpha$) defining a conical shape of the second seat, wherein an axial length of the cylindrical bottom surface has an axial length smaller than the axial thickness (Sa) of the snap ring.

3. The bearing unit of claim 2, wherein the angle ($\alpha$) is between a minimum value of 94° and a maximum value of 100°.

4. The bearing unit of claim 3, wherein a play (g) is defined at the first inlet edge of the second seat for mounting the snap ring in the second seat, the play (g) being defined by the formula:

$$g = L1 - Sa - Ss$$

wherein L1 is an axial distance from an outer inlet edge of the second seat to a radially inner surface of the radially outer ring.

5. The bearing unit of claim 2, wherein the first annular surface is connected to a cylindrical surface of the outer ring by a first fillet radius (r2) and connected to the cylindrical bottom surface by a second fillet radius (r4), and wherein the second straight annular surface is connected to the cylindrical bottom surface by a third fillet radius (r6) and connected to the cylindrical surface of the outer ring by a fourth fillet radius (r8).

6. The bearing unit of claim 5, wherein an axial width (Ls) of the second seat measured at the cylindrical bottom surface is defined by:

$$Ls = L2 - (Ps - r2 - r4) \times \tan(\alpha - 90) - r2 - r4 - r6 - r8$$

wherein Ls is an axial width of the second seat measured at the cylindrical bottom surface, and L2 is an axial width of the second seat measured from the inner inlet edge to an outer inlet edge.

7. The bearing unit of claim 5, wherein a play (g) is defined at the first inlet edge of the second seat for mounting the snap ring in the second seat, the play (g) being defined by the formula:

$$g = L1 - Sa - Ss$$

wherein L1 is an axial distance from an outer inlet edge of the second seat to a radially inner surface of the radially outer ring.

8. The bearing unit of claim 2, wherein a play (g) is defined at the inner inlet edge of the second seat for mounting the snap ring in the second seat, the play (g) being defined by the formula:

$$g = L1 - Sa - Ss$$

wherein L1 is an axial distance from an outer inlet edge of the second seat to a radially inner surface of the radially outer ring.

9. The bearing unit of claim 2, wherein the snap ring further comprises a slit with a length of between 2% and 4% of the axial width of the second seat measured from the cylindrical bottom surface of the second seat.

10. The bearing unit of claim 1, wherein the second seat extends radially inside the radially outer ring from an inner-lying free cylindrical surface of the radially outer ring.

11. The bearing unit of claim 1, wherein a diameter (Da) of the snap ring, in an uninstalled state, is greater than the diameter (Ds) of the second seat by between 3% and 5%.

* * * * *